US010637366B2

United States Patent
van der Merwe et al.

(10) Patent No.: US 10,637,366 B2
(45) Date of Patent: Apr. 28, 2020

(54) TWO STAGE CONTROL OF CONVERTER SYSTEM WITH FLOATING CELLS

(71) Applicant: ABB Schweiz AG, Baden (CH)

(72) Inventors: Wim van der Merwe, Ennetbaden (CH); Tobias Geyer, Ennetbaden (CH); Mario Schweizer, Rütihof (CH); Ioannis Tsoumas, Zürich (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/272,234

(22) Filed: Feb. 11, 2019

(65) Prior Publication Data

US 2019/0190397 A1  Jun. 20, 2019

Related U.S. Application Data

(63) Continuation of application No. PCT/EP2017/070341, filed on Aug. 10, 2017.

(30) Foreign Application Priority Data

Aug. 11, 2016 (EP) .................................. 16183864
Sep. 22, 2016 (EP) .................................. 16190040

(51) Int. Cl.
*H02M 7/49* (2007.01)
*H02M 5/458* (2006.01)
*H02M 7/487* (2007.01)

(52) U.S. Cl.
CPC ......... *H02M 5/4585* (2013.01); *H02M 7/487* (2013.01); *H02M 7/49* (2013.01)

(58) Field of Classification Search
CPC .......... H02M 7/42; H02M 7/48; H02M 7/487; H02M 7/501; H02M 7/4826; H02M 7/497;
(Continued)

(56) References Cited

U.S. PATENT DOCUMENTS 5,805,437 A  9/1998 Gruning
6,009,002 A  12/1999 Steimer
(Continued)

FOREIGN PATENT DOCUMENTS

DE  19615855 A1  10/1997
EP   0802617 A2  10/1997
(Continued)

OTHER PUBLICATIONS

Silva et al., "Control of an Hybrid Multilevel Inverter for Current Waveform Improvement," 2008 IEEE International Symposium on Industrial Electronics, Jun. 2008, pp. 2329-2335.
(Continued)

*Primary Examiner* — Bryan R Perez
(74) *Attorney, Agent, or Firm* — J. Bruce Schelkopf; Taft Stettinius & Hollister LLP

(57) ABSTRACT

A method for controlling a converter system includes: determining, with a first controller stage, an output voltage reference for the converter system; generating, with the first controller stage, switching commands for a main converter based on the output voltage reference, such that the main converter converts an input voltage into an intermediate voltage provided at an output of the main converter and following the output voltage reference; and generating, with a second controller stage, switching commands for a floating converter cell connected to the output of the main converter, such that the floating converter cell converts the intermediate voltage into an output voltage provided at an output of the floating converter cell, wherein the floating converter cell comprises a cell capacitor and a semiconductor switch arrangement for connecting and disconnecting the cell capacitor between the output of the main converter and the output of the floating converter cell.

19 Claims, 4 Drawing Sheets

(58) Field of Classification Search
CPC ...... H02M 7/49; H02M 7/4807; H02M 7/537;
H02M 7/5387; H02M 7/53; H02M 7/533;
H02M 5/40; H02M 5/42; H02M 5/44;
H02M 5/443; H02M 5/45; H02M 5/4505;
H02M 5/451; H02M 5/452; H02M 5/458;
H02M 5/4585
USPC ........ 363/40, 41, 43, 55, 65, 71, 72, 95, 97,
363/98, 131, 132, 35–37, 135, 136, 137
See application file for complete search history.

(56) References Cited

U.S. PATENT DOCUMENTS

| | | | |
|---|---|---|---|
| 6,621,719 | B2 | 9/2003 | Steimer et al. |
| 7,825,540 | B2 | 11/2010 | Ogusa et al. |
| 2009/0085405 | A1 | 4/2009 | Ogusa et al. |
| 2011/0280049 | A1* | 11/2011 | Mori ............... H02M 1/4216 363/25 |
| 2012/0092915 | A1* | 4/2012 | Okuda ............... H02M 7/487 363/132 |
| 2012/0134184 | A1 | 5/2012 | Park |
| 2014/0301124 | A1* | 10/2014 | Wu ............... H02M 7/49 363/132 |
| 2015/0357937 | A1 | 12/2015 | Takahara et al. |
| 2016/0043651 | A1* | 2/2016 | Fulcher ............... H02M 7/04 290/44 |

FOREIGN PATENT DOCUMENTS

| | | |
|---|---|---|
| EP | 0884831 A2 | 12/1998 |
| EP | 1253706 A1 | 10/2002 |
| RU | 2269196 A1 | 1/2006 |

OTHER PUBLICATIONS

Veenstra et al., "Control of a Hybrid Assymetric Multilevel Inverter for Competitive Medium-Voltage Industrial Drives," IEEE Transactions on Industry Applications, vol. 41, No. 2, Mar./Apr. 2005, pp. 655-664.

Veenstra, "Investigation and Control of a Hybrid Asymmetric Multi-Level Inverter for Medium-Voltage Application," Ph.D. Thesis, Ecole Polytechnique Federale Lausanne, 2003, 167 pp.

European Patent Office, International Search Report & Written Opinion issued in corresponding Application No. PCT/EP2017/070341, dated Oct. 17, 2017, 9 pp.

Cordova et al., "Hybrid Multilevel Inverter Drive with Synchronous Modulation and Current Waveform Improvement," 2009 IEEE International Electric Machines and Drives Conference, pp. 158-164.

Pereda et al., "Cascaded Multilevel Converters: Optimal Asymmetries and Floating Capacitor Control," IEEE Transactions on Industrial Electronics, vol. 60, No. 11, Nov. 2013, pp. 4784-4793.

Silva et al., "Implementation and Control of a Hybrid Multilevel Converter with Floating DC Links for Current Waveform Improvement," IEEE Transactions on Industrial Electronics, vol. 58, No. 6, Jun. 2011, pp. 2304-2312.

Vasquez et al.,"Model Predictive Control for an Asymmetric Multilevel Converter with Two Floating Cells per Phase," Conference Paper, Sep. 2015, DOI: 10.1109/EPE.2015.7309395, 10 pp.

Vasquez et al., "Predictive Control Algorithm Technique with reduced number of calculation for Asymmetric Multilevel Converter with Floating Cells," 2015 IEEE International Conference on Industrial Technology, pp. 1129-1135.

Vasquez et al., "Predictive Control of a Hybrid Asymmetric Multilevel Converter with Floating Cells," 2014 IEEE International Conference on Industrial Technology, Feb. 26-Mar. 1, 2014, Busan, Korea, pp. 278-283.

* cited by examiner

Fig. 5

| | I+ | -- | - | 0 | + | ++ |
|---|---|---|---|---|---|---|
| | ++ | 1 | 1 | 1 | 1 | 1 |
| | + | 1 | 1 | 1 | 1 | 0 |
| | 0 | 1 | 0 | 0 | 0 | -1 |
| | - | 0 | -1 | -1 | -1 | -1 |
| | -- | -1 | -1 | -1 | -1 | -1 |

TWO STAGE CONTROL OF CONVERTER SYSTEM WITH FLOATING CELLS

FIELD OF THE INVENTION

The invention relates to the field of operation methods for power electronic applications. In particular, the invention relates to a method and a controller for operating a converter system, as well as to the converter system.

BACKGROUND OF THE INVENTION

It is known to use auxiliary floating converter cells to improve the harmonic performance of high power and/or medium voltage converter systems. The floating converter cells are included into the output of a main converter forming a floating cell stage for improving the harmonic content of the voltages generated by the main converter. The floating converter cells may only deliver reactive power and may be designed such that no auxiliary transformer windings are required to provide active power to the floating converter cells. In this case, cell capacitors of the floating converter cells may be balanced using energy taken from the main converter.

There are several approaches, how to control the floating converter cells. For example, a pulse-width modulated controller may be used to control the switching behavior of the floating converter cells. It also may be possible to determine the switching states of the whole converter system in one single controller. Furthermore, common-mode currents that are created by the switching of the main converter may be used to control the capacitor voltage of cell capacitors of the floating converter cells.

EP 0 884 831 A2 describes a control method for the converter topology described in DE 196 15 855 A1 based on pulse-width modulation. In EP 0 884 831 A2, the capacitor voltage of auxiliary converter cells is controlled through rectifier circuits.

In EP 1 253 706 B1, floating converter cells without rectifier circuits are described. A model predictive type controller is used to control both the main inverter and the floating converter cells in a single control stage. Furthermore, it is assumed that the capacitor voltages are controlled such that the complete converter system is regarded as a multilevel converter with equally spaced voltage steps. The capacitor voltage balancing is done by using the common-mode currents that are generated by the switching process and choosing redundant states of the converter system such that these currents are generated in proportion to the capacitor voltage error.

In U.S. Pat. No. 7,825,540 B2, a converter system with a main converter and with floating converter cells is shown, which are controlled by pulse-width modulation.

DESCRIPTION OF THE INVENTION

It is an objective to control a converter system with a main converter and floating converter cells connected to outputs of the main converter in a simple and effective way.

This objective is achieved by the subject-matter of the independent claims. Further exemplary embodiments are evident from the dependent claims and the following description.

A first aspect of the invention relates to a method for controlling a converter system. The converter system comprises a main converter, which may have any type of converter topology, but, in particular, may be a multi-level converter, and one or more floating converter cells, which are connected to outputs of the main converter. The main converter is controlled by a first controller stage and the one or more floating converter cells are controlled by a second controller stage, which both stages generate their switching commands based on a voltage output reference. Both controller stages may generate their switching commands independently from each other.

According to an embodiment of the invention, the method comprises: generating, with the first controller stage, switching commands for a main converter based on the output voltage reference, such that the main converter converts an input voltage into an intermediate voltage provided at an output of the main converter and following the output voltage reference; generating, with a second controller stage, switching commands for a floating converter cell connected to the output of the main converter, such that the floating converter cell converts the intermediate voltage into an output voltage provided at an output of the floating converter cell, wherein the floating converter cell comprises a cell capacitor and a semiconductor switch arrangement for connecting and disconnecting the cell capacitor between the output of the main converter and the output of the floating converter cell.

It has to be noted that the main converter may have more than one output, thus generating a multi-phase voltage. The intermediate voltage and the output voltage may be multi-phase voltages. In the case of a multi-phase converter system, a floating converter cell may be provided at each output of the main converter. The converter cells may provide outputs for the multi-phase output voltage.

The output voltage reference, which may comprise several components in the case of a multi-phase output of the main converter, may be determined by the first controller stage based on control objectives of the overall converter system, such as a torque of an electrical machine supplied by the converter system, etc. Both the first controller stage and the second controller stage determine their switching commands (i.e. for the main converter and for the floating converter cells) from this output voltage reference.

Semiconductor switches of the main converter are controlled by the first controller stage that in the one or more outputs of the main converter an intermediate voltage is generated, which may follow the output voltage reference, but may deviate from the output voltage reference. In general, the intermediate voltage may be limited to the voltage levels, the main converter may generate. Also, the intermediate voltage may have several components for different phases of the main converter. In such a way, an output voltage error (which also may have a component of each phase) may occur.

To compensate this output voltage error at least partially, semiconductor switches of the one or more floating cells are controlled by the second controller stage. In particular, cell capacitors of the one or more floating converter cells may be connected and/or disconnected to the one or more outputs of the main converter, such that the output voltage error is at least partially compensated and an output voltage (which also may have a component for each phase of the main converter) has a smaller output voltage error with respect to the output voltage reference.

According to an embodiment of the invention, the switching commands for the one or more floating converter cells are selected by the second controller stage by: determining an output voltage error indicative of a deviation of the output voltage from the output voltage reference; determining one or more cell capacitor voltages of the one or more converter cells; and selecting switching commands for the one or more converter cells, such that the output voltage error is reduced or minimized and such that the one or more cell capacitor voltages stay within predefined bounds.

The second controller stage may minimize or at least reduce the output voltage error at the phase terminals providing the output voltage and may maintain the capacitor voltage of each converter cell close to its nominal value and/or within bounds defined by the nominal value. By directly manipulating the switch positions of the floating converter cells, a very good harmonic behavior with limited capacitor energy storage requirements may be achieved. Furthermore, since the second controller stage may be implemented independently from the first controller stage, its implementation may be relatively easily achieved, for example in an already existing control hardware and software environment.

The second controller stage, which may act independently of the first controller stage, may be based either on a direct modulation principle using either one or more lookup tables and/or one or more cost functions to achieve the controller goals of reducing the output voltage error and to keep the capacitor voltages within bounds. The second controller stage may directly control the capacitor voltage as well as the output voltage distortion, i.e. the output voltage error. The one or more cell capacitor voltages may not be controlled to a reference value but rather kept within predefined bounds utilizing the full feasible capacitor energy storage capability to optimize the output voltage quality. In such a way, the converter system is not creating discrete output levels, but rather the discrete output values may change with time and operational condition. This may reduce the energy storage requirements in the floating capacitors while also increasing the efficiency of the floating cells to minimize the output distortion. In this way the loss of the discrete, and constant, output voltage levels in the main converter, may be traded for other performance metrics. This may not be possible when the capacitor voltages are controlled to fixed references, even if the references may in themselves by time varying. It may only be achieved if the capacitor voltages are allowed to move as much as the application requires and/or may be only limited to protect the system against over voltages or alternatively prohibiting the voltage to become so low that the total effect of adding or subtracting the voltage no longer has a significant effect.

According to an embodiment of the invention, the method further comprises: quantizing the output voltage error and the one or more cell capacitor voltages; and selecting the switching commands for the one or more floating converter cells from a lookup table indexed by the quantized output voltage error and the quantized capacitor voltage error. Quantizing a quantity may mean that the possible values of the quantity are separated into intervals and/or bins and that the quantity is represented by its interval and/or bin. The second controller stage may comprise one or more lookup tables, which are indexed by a set of these intervals and/or bins. In the simplest case, the lookup table may be two-dimensional and may have a first index based on intervals and/or bins of the output voltage error and a second index based on intervals and/or bins for the cell capacitor voltage. Every cell or entry of the lookup table may encode a switching command for the one or more floating converter cells. The entries in the one or more lookup tables may be seen as control tuning variables that determine the final operational performance of the converter system.

According to an embodiment of the invention, the method further comprises: quantizing one or more main converter phase currents measured in the one or more outputs of the main converter and selecting the switching commands for the one or more floating converter cells from the lookup table additionally indexed by quantized main converter phase currents.

Additionally, the one or more lookup tables may have a third index based on the one or more phase currents of the main converter.

According to an embodiment of the invention, the lookup table is additionally indexed by a phase of the output voltage. It may be that different phases of the main converter have different lookup tables. However, it also may be possible that the same lookup table is used for all phases. In general, for an n-phase main converter, either n independent lookup tables or one single lookup table may be used, which single lookup table may take all redundancies and/or other circuit topographical aspects of the multitude of phases into account.

According to an embodiment of the invention, a common-mode voltage in the output voltage is quantized and the lookup table is additionally indexed by the quantized common-mode voltage. As further index, a quantized common-mode voltage may be used. The common-mode voltage may be the sum of all phases of the output voltage.

According to an embodiment of the invention, for polyphase systems, phase voltages and/or phase currents are transformed into a transformed voltages and/or transformed currents by a direct-quadrature-zero axis transformation in a stationary or in a rotating reference frame. For example, the transformation may be a Clarke-transform or a Park transform. Then, the lookup table may be indexed by the quantized transformed voltage and/or current values. It also may be possible that the calculations of the second controller stage are based on transformed quantities, which may simplify calculations and/or may reduce the size and/or redundancy of the lookup tables.

According to an embodiment of the invention, the switching commands of the one or more floating converter cells are selected by minimizing a cost function, which is a function of the output voltage error and the one or more cell capacitor voltages. Possible future switching commands of the one or more floating converter cells may be determined and these possible future switching commands may be rated with the cost function. For example, the possible future switching command with the smallest value of the cost function may be used for determining the (real) next switching command to be applied to the corresponding floating converter cell.

The cost function may be a function, in which one or more possible future states may be input and which may be evaluated to a value indicative of different control goals.

According to an embodiment of the invention, the cost function comprises a term with a sum of the output voltage error and a predicted cell capacitor voltage of the floating converter cell after the application of a possible next switching command to the floating converter cell. In other words, the cost function may penalize a difference between the output voltage error and the cell capacitor voltage provided by the floating converter cell after application of the possible next, future switching command.

According to an embodiment of the invention, the cost function comprises a term with the predicted cell capacitor voltage after the application of a possible next switching command. The function may also comprise a cell capacitor error, which is a difference between a setpoint voltage of the cell capacitor and a predicted cell capacitor voltage of the floating converter cell after the application of a possible next switching command to the floating converter cell. Thus, the cost function may penalize a deviation of the cell capacitor voltage from a setpoint voltage and/or may penalize a cell capacitor voltage leaving predefined bounds.

The term with the cell capacitor voltage may be designed in such a way, that a penalty for the cell capacitor error is very large for high deviations, for example outside bounds, and is rather low, when the cell capacitor error is within these bounds. For example, the term with the cell capacitor error exponentiated with a number bigger than 2. Also, deadbands in the cost function may be used for the capacitor voltage and/or the cost function may comprise a piece-wise linear cost assignment to the cell capacitor voltage cost. In such a way, the cell capacitor voltage may stay within the predefined bounds without unduly sacrificing output voltage quality by tightly controlling the capacitor voltage to a reference.

According to an embodiment of the invention, the cost function comprises a term penalizing a difference between an actual applied switching command and a possible next switching command. For example, the switching commands may be assigned to different values and the term may be based on a difference of the value of the actually applied switching command and the value of the possible next, future switching command. In such a way, switching losses may be penalized.

According to an embodiment of the invention, the cost function is minimized subject to a set of admissible switching commands. It may be that the possible next, future switching commands for a floating converter cell are taken from a lookup table based on the actual applied switching command. In other words, the admissible switching commands may be determined from a lookup table providing a set of admissible switching commands for each applied switching command.

According to an embodiment of the invention, for selecting a next switching command of a floating converter cell, a cost function is minimized separately for every floating converter cell, which cost function is based on the voltage error of a phase of the floating converter cell and the cell capacitor voltage of the floating converter cell of this phase. In general, for an n-phase main converter, n independent cost functions that determine the next switching command for each of the floating converter cells separately may be used.

According to an embodiment of the invention, the next switching commands of all floating converter cells are selected by minimizing a common cost function being a function of the output voltage errors of all phases and the cell capacitor voltages of all converter cells. A single, common cost function may be used that determines the whole set of next switching commands for all floating converter cells of all phases. The single cost function may take redundancies and/or other circuit topographical aspects of the multitude of phases into account. Furthermore, the common cost function may be based on a transformed quantity being transformed by a direct-quadrature-zero axis transformation in a stationary or in a rotating reference frame. For example, the common cost function may be based on Clarke transformed or Park transformed quantities.

The output voltage error that is used for penalizing a difference between the output voltage and the output voltage reference may be based on line-to-ground and/or line-to-line voltages and/or line-to-virtual-star-point voltages of different phases. Furthermore, the output voltage error may be based on a time integral over voltage differences, i.e. the output voltage error may be seen as a flux error.

According to an embodiment of the invention, the output voltage error is based on a difference of an actual intermediate voltage measured at the output of the main converter and the output voltage reference.

According to an embodiment of the invention, the output voltage error is based on a time integral over the difference between the output voltage reference and the actual intermediate voltage.

According to an embodiment of the invention, the output voltage error is based on a difference of an actual phase-to-phase voltage between outputs of the main converter and a phase-to-phase output voltage reference.

According to an embodiment of the invention, the output voltage error is based on a time integral over the difference of an actual phase-to-phase voltage between outputs of the main converter and a phase-to-phase output voltage reference.

According to an embodiment of the invention, the main converter comprises more than one output providing an intermediate voltage with more than one phase and at least one floating converter cell is connected to each output of the main converter, such that each floating converter cell converts a phase of the intermediate voltage into a phase of the output voltage provided at an output of the respective floating converter cell. As already mentioned, the converter system may be a multi-phase system, for example a three-phase system. In the case of a multi-phase system, voltages and/or currents at the outputs of the main converter and at the outputs of the floating cells may have a component for each phase, i.e. may be vectors. These vectors may be transformed by transformations as Clarke- or Park-transformations, as mentioned above. Furthermore, the lookup table and the cost function may be based on these vectors. It has to be noted that the number of floating converter cells per phase is not fixed and one or more floating converter cells may be connected to one output of the main converter.

According to an embodiment of the invention, three different switching commands for a floating converter cell are selectable, and due to a switching command, the cell capacitor of a floating converter cell is connected between the output of the main converter and the output of the floating converter cell, such that: for a first switching command, the output voltage of the floating converter cell is higher than the intermediate voltage provided by the main converter; for a second switching command, the output voltage of the floating converter cell is equal to the intermediate voltage provided by the main converter; for a third switching command, the output voltage of the floating converter cell is lower than the intermediate voltage provided by the main converter. In general, the cell capacitor of a floating converter cell may be connected between the corresponding output of the man converter and the output of the converter cell in two different directions. Furthermore, the corresponding output of the man converter and the output of the converter cell may be directly connected with each other by the floating converter cell.

For example, each floating converter cell may comprise a first half-bridge and a second half-bridge interconnected in parallel with the cell capacitor. The main converter output of the phase is connected to a midpoint of the first half-bridge and the floating cell stage output of the phase is connected to a midpoint of the second half-bridge. The cell capacitor may be connected in parallel to the first and second half-bridge.

A further aspect of the invention relates to a controller with a first controller stage and a second controller stage adapted for controlling a converter system as described in the above and in the following. It has to be noted that the first controller stage and the second controller stage may be different modules of the same hardware or may be implemented in different hardware. In general, the control method may be implemented on any computational hardware including DSPs, FPGAs, microcontroller, CPUs, GPUs, multi-core platforms, and combinations thereof.

The first controller stage may be seen as a main application controller that controls the application, such as an electrical machine or a grid connection, which is supplied by the converter system. As already described, the first controller stage may determine the switching commands for the main converter, for example taking objectives of a DC link of the main controller and/or the applications in consideration. The first controller stage provides the output voltage reference to the second controller stage.

The second controller stage determines the switching commands for the one or more floating converter cells. The switching commands may be determined in a way such that the one or more cell capacitor voltages are controlled to a setpoint and/or are kept within bounds, while the waveform of the output voltage is kept as close as possible to the output voltage reference. In general, the objective of the second controller stage may be stated as the control of the harmonic spectrum of either the load current and/or the load voltage, while the cell capacitor voltages may move as much as possible, i.e. within defined limits. Additionally, the cell capacitor voltages may be kept close to their setpoints.

More specifically, the objective of the second controller stage may be to directly control a difference between the intermediate voltage and the output voltage reference as provided by the first controller stage, while the cell capacitor voltages may move as much as possible, i.e. within defined limits. In this way, the second controller stage may control a harmonic content of the output voltage.

It is also possible that the second controller stage controls a time integral of a difference between the intermediate voltage and the output voltage reference, while the cell capacitor voltages may move as much as possible, i.e. within defined limits. In this way, the second controller stage may control the harmonic content of the output flux (and therefore of the phase current).

As described above, the second controller stage may act either as a direct modulator using quantized values and a lookup table or as a direct modulator based on a cost function.

The second controller stage may make optimal decisions at every time instant at which the control actions are evaluated and decided.

A further aspect of the invention relates to a converter system for converting an input voltage into an output voltage, which may have one or more phases.

According to an embodiment of the invention, the converter system comprises a main converter, which may be a multi-level converter, for converting the input voltage into an intermediate voltage provided by the one or more main converter outputs. Furthermore, the converter system comprises a floating cell stage for converting the intermediate voltage into the output voltage provided by the one or more floating cell stage outputs, wherein the floating cell stage comprises one or more floating converter cells interconnecting the main converter output(s) with the floating cell stage output(s).

Additionally, the converter may comprise a controller as described above and in the following.

According to an embodiment of the invention, the floating cell stage comprises one or more electric filters connected between the main converter and a floating cell and/or between two floating cells and/or between a floating cell and the output. The output voltage may be measured between the floating converter cell and the filter or the output voltage is measured between the floating converter cell and the floating cell stage output of the respective phase. For example, the measured output voltage may be used by the first controller stage to determine the output voltage reference.

It has to be understood that features of the method as described in the above and in the following may be features of the controller and/or the converter system as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

FIG. 5 shows a diagram with a lookup table for the controller of FIG. 4.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
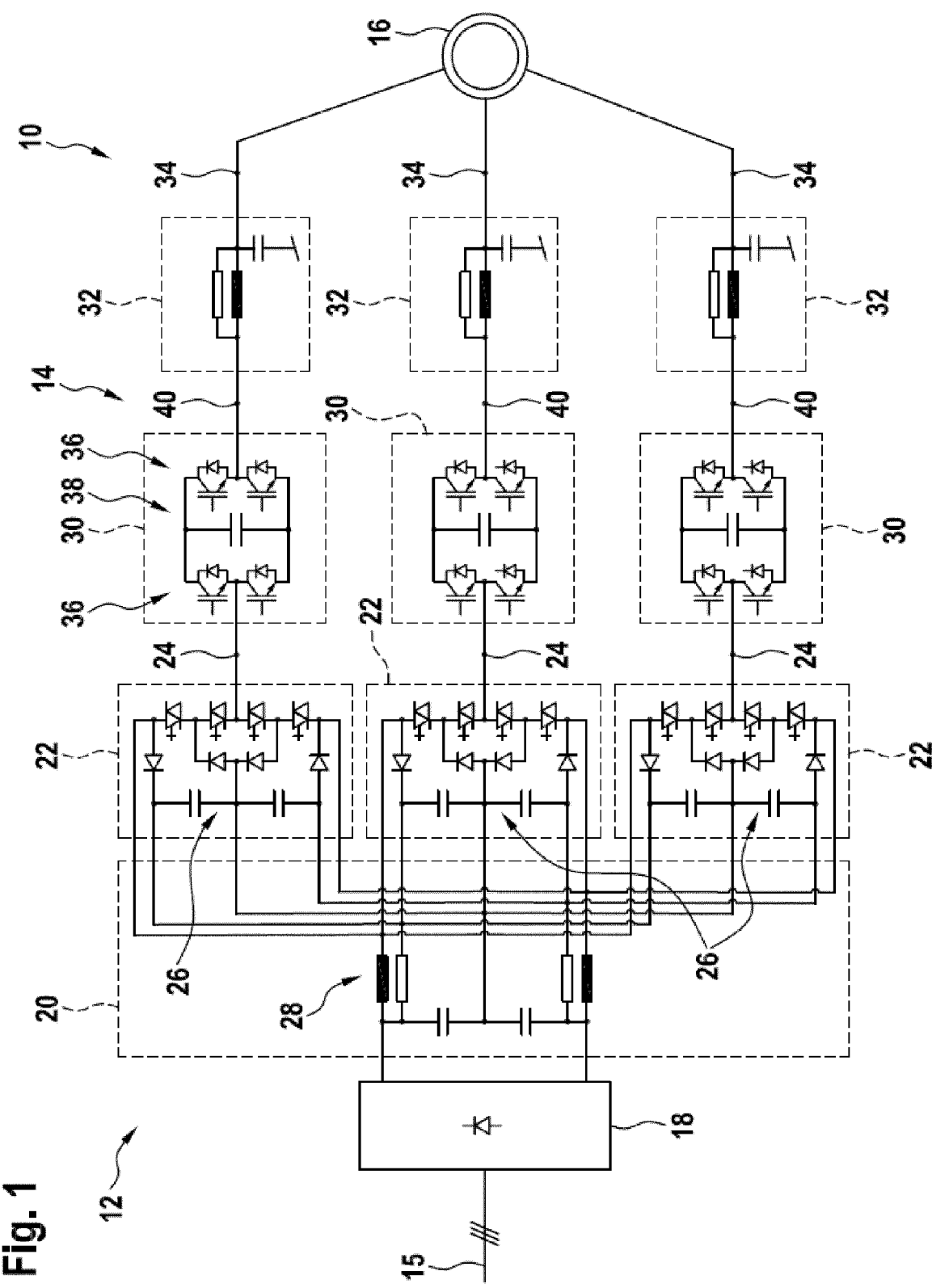
FIG. 1 schematically shows a converter system according to an embodiment of the invention.

FIG. 1 shows a converter system 10 with a main converter 12 and a floating cell stage 14. The converter system 10 is adapted for transforming a first AC voltage provided by a power grid 15 into an output voltage to be supplied to an electrical load 16.

The main converter 12 comprises a rectifier 18, which may be a passive diode rectifier, which is adapted for converting the AC voltage from the power grid 15 into a DC voltage, which is supplied to a main DC link 20. Furthermore, the main converter 12 comprises three output converters 22, each of which is adapted for transforming the DC voltage in the DC link 20 into a phase of an intermediate voltage that is provided at outputs 24 of the main converter 12. The output converters 22 are connected in parallel to the DC link, for example via clamp inductors and/or resistors 28 or directly. Each of the output converters 22 may comprise a clamp circuit 26 with two capacitors. The DC links 26 may be a split DC link.

Furthermore, each of the output converters 22 may be, as shown, a 3-level neutral point clamped converter, which may be based on IGCTs, but other topologies and semiconductor types are possible. Also, for the overall main converter 12, other topologies are possible. In general, the main converter 12 may be adapted to provide two- or multi-level intermediate voltage at the outputs 24, optionally with more than one phase. Also, the inductors 28 provide an IGCT di/dt clamp circuit. In the case of other type of semiconductor switches, such as IGBTs, the inductors 28 may be omitted. The clamp circuits 26 may be used for controlling a device voltage during switching. The clamp circuits 26, normally used for IGCT switches, may or may not be omitted for other choices of semiconductor switches.

For every phase of the main converter 12, the floating cell stage 14 comprises a floating converter cell 30 and optionally an output filter 32, which are connected in series between the respective output 24 of the main converter and an output 34 of the converter system 10. It may be possible that more than one floating converter cell 30 is connected in series and/or in parallel between the output 24 and the output 34 of a phase.

Every floating converter cell 30 comprises two half-bridges 36, which are connected in parallel with a cell capacitor 38. A first midpoint of one of the half-bridges 36 is connected to the output 24 of the main converter 12. A second midpoint of the other one half-bridge 36 provides an output 40 of the floating converter cell 30 and is connected via the optional filter 32 with the respective output 34 of the converter system 10.

The floating converter cells 30 comprise three different switching states, that may be reached by accordingly switching their semiconductor switches (two per half-bridge), which, for example, may be IGBTs. In a first switching state, the floating converter cell 30 directly connects the output 24 with the output 40. In a second switching state, the converter cell 30 connects the cell capacitor 38 between the outputs 24, 40, such that the cell capacitor voltage of the cell capacitor 39 is added to the intermediate voltage provided at the output 24. In a third switching state, the floating converter cell 30 connects the cell capacitor 38 between the outputs 24, 40, such that the cell capacitor voltage of the cell capacitor 38 is subtracted to the intermediate voltage provided at the output 24. In such a way, the intermediate voltage from the main converter, which usually is shaped like a step-function due to the finite number of levels of the main converter, may be converted into a voltage (i.e. the output voltage) which better approximates the sinusoidal and/or continuous output voltage reference.

By switching the floating converter cells 30 accordingly, the floating converter cells 30 may push low frequency harmonics that come from the main converter 12, higher into the frequency band. Thus, the harmonics may be filtered more easily and/or do have a smaller influence on the current.

Each of the filters 32 may comprise inductors, resistors and/or capacitors for electrical filtering the output voltage for even more damping higher order harmonics.

Figure 2:
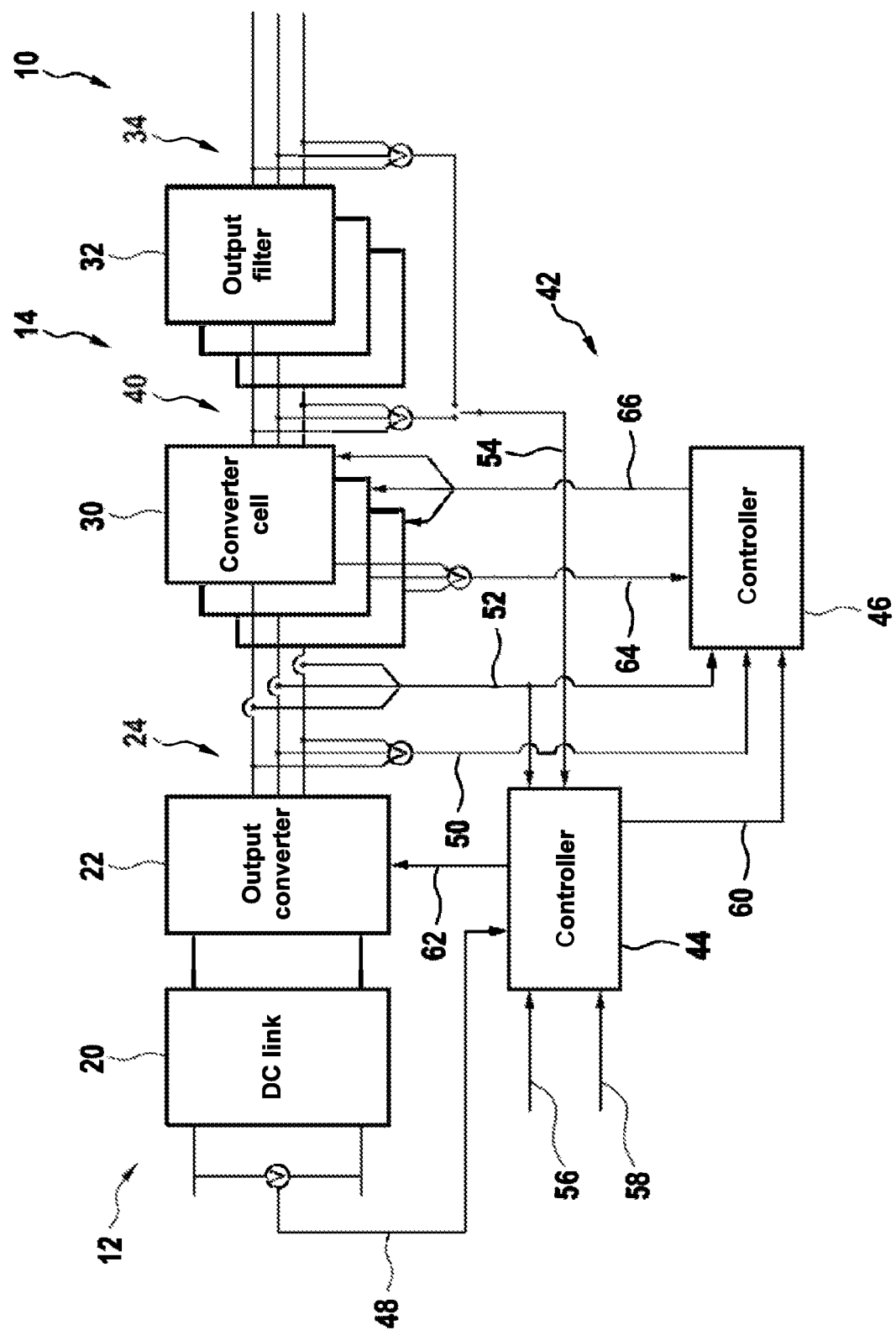
FIG. 2 schematically shows a converter system according to an embodiment of the invention.

FIG. 2 shows the converter system of FIG. 1 with a controller 42 that comprises a first controller stage 44 and a second controller stage 46.

The first controller stage 44 receives measurement signals for a DC link voltage 48, the phase current 52 in the outputs 24, an intermediate voltage in an output 50, and the output voltage 54 in the outputs 40 and/or 34. Furthermore, the first controller stage 44 receives setpoints 56 for the converter system 10, for example from an outer control loop and optionally further sensor data 58. From this, the first controller determines an output voltage reference 60, from which switching commands 62 for the main converter 12 are derived, which are applied to the semiconductor switches of the main converter 12.

The output voltage reference 60 is also provided to the second controller stage, which receives measurement signals for an intermediate voltage 50 in the outputs 24 and the phase current 52. Furthermore, the second controller stage 36 receives measurement signals for cell capacitor voltages 64 of the cell capacitors of the floating converter cells 30. From these inputs, the second controller stage 46 determines switching commands 66, which are applied to semiconductor switches of the floating converter cells 30. For each floating converter cell 30, the switching commands 66 may encode the above mentioned three switching states, into which the floating converter cell 30 may be switched.

It has to be noted that in a case of a multi-phase converter system 10, the quantities 60, 50, 52 and 54 have a component for each phase and may be seen as vectors.

Figure 3:
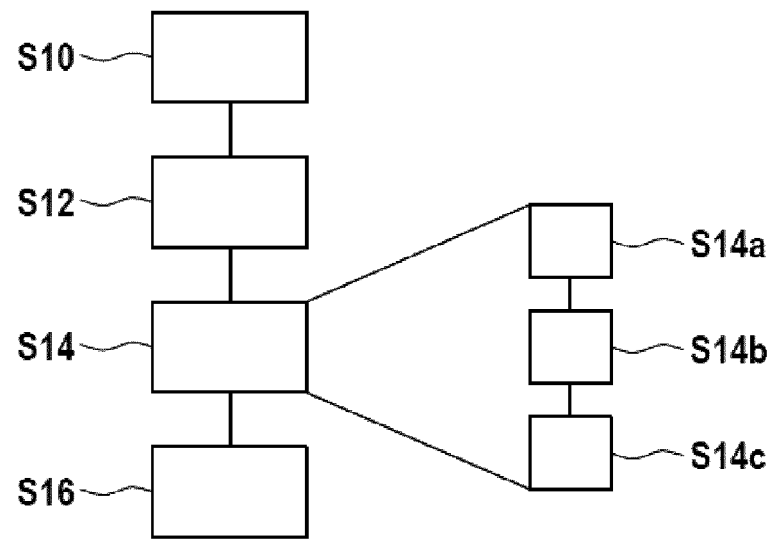
FIG. 3 shows a flow diagram for a method for operating a converter system according to an embodiment of the invention.

FIG. 3 shows a method for controlling the converter system 10 of FIG. 1 and FIG. 2, which may be performed by the controller 42.

In step S10, the first controller stage 44 determines an output voltage reference 60 for the converter system 10, which, for example, may also be based on setpoints provided by an outer control loop and by measurements in the converter system, such as DC link voltage, the output voltage 54 and/or the phase current 52.

In step S12, the first controller stage 44 generates switching commands 62 for the main converter 12 based on the output voltage reference 60, such that the main converter 12 converts an input voltage, such as the DC link voltage 48, into the intermediate voltage 50. The switching commands 62 are generated such that the intermediate voltage 50 follows the output voltage reference 60.

In step S14, the second controller stage 46 generates the switching commands 66 for the one or more floating converter cells 30, such that the floating converter cells 30 convert the intermediate voltage 50 into an output voltage 54 provided at the outputs 40, 34. One problem faced in the control of the floating converter cell stage 14 are the contradictory goals of keeping the capacitor voltages 64 within predefined bounds while minimizing the harmonic distortion of the output voltage 54.

These two objectives are achieved by the second controller stage 46 by performing the subsets S14a to S14c, in which the switching commands 66 for the floating converter cell 30 are actively selected. Contrary to a pulse-width modulated approach, the second controller stage is a direct modulator, which in every time step actively determines the next best switching commands, which optimize the above mentioned two objectives simultaneously. As already described and explained in detail below, this may be done based on a lookup table or a cost function.

In step S14a, the second controller stage 46 determines an output voltage error indicative of a deviation of the output voltage 54 from the output voltage reference 60. This output voltage error either may be the input for a cost function or may be quantized and used for selecting an entry of a lookup table.

The output voltage error may be based on a difference of the actual intermediate voltage 50 measured at the output 24 of the main converter 12 and the output voltage reference 60 or may be based on a time integral over this difference.

It also may be possible that the output voltage error is determined from line-to-line voltages and/or line-to-virtual-star-point voltages and that the output voltage error is based on a difference of an actual phase-to-phase voltage between the outputs 24 of the main converter 12 and a phase-to-phase output voltage reference, which may be calculated from the output voltage reference 60. Furthermore, it also may be possible that the output voltage error is based on an integral over this difference.

Additionally, it is possible that the output voltage 54 is measured between the floating converter cell 30 and the electrical filter 32 and/or the output voltage 54 is measured between the floating converter cell 30 and the floating cell stage output 34, i.e. after or before the electrical filter 32.

In step S14b, the second controller stage 46 determines cell capacitor voltages 64 of the floating converter cells 30. These cell capacitor voltages either may be a further input for a cost function or may be quantized and used for selecting an entry of the above mentioned lookup table.

In step S14c, the second controller stage 46 selects switching commands 66 for the floating converter cell 30, such that the output voltage error is reduced and such that the cell capacitor voltage 64 stays within predefined bounds. For example, the switching commands are encoded in an entry of a lookup table. In the case of the cost function, the cost function may be evaluated with sets of possible next switching commands 66 and the set of switching commands 66, which minimizes the cost function, i.e. has the lowest cost function value, may be chosen as the next switching commands 66 applied to the floating converter cells.

In steps S16, the switching commands 62 and 66 are applied to the main converter 12 and the floating converter cells 30. After that, the steps of the method may be repeated by the controller 42.

Using a Lookup Table

Figure 4:
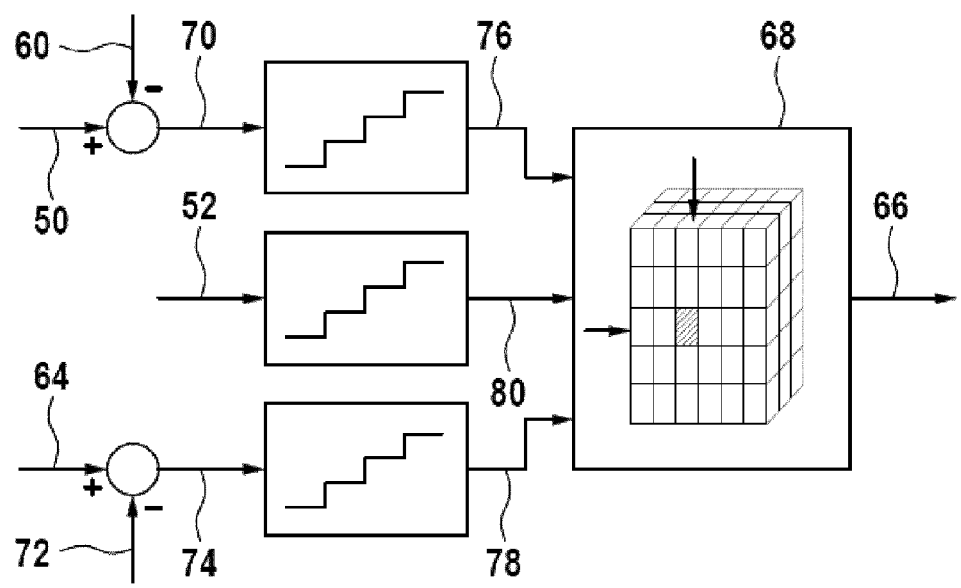
FIG. 4 schematically shows a lookup table based controller according to an embodiment of the invention.

With respect to FIG. 4, the method step S14 and its substeps S14a to S14c are explained with respect to selecting the switching commands 66 based on a lookup table 68.

The output voltage error 70 is determined by subtracting the actual intermediate voltage 50 of the main converter 12 from the output voltage reference as determined by the first controller 44. The resulting output voltage error 70 is quantized into several bins. For example, the bins may be called $\Psi_{--}$, $\Psi_{-}$, $\Psi_0$, $\Psi_{+}$, and $\Psi_{++}$. These bins may be seen as quantized output voltage error 76.

Also, the cell capacitor voltage 64 of each floating converter cell 30 may be subtracted from a setpoint $V_c^*$, i.e. a cell capacitor reference 72 to give a cell capacitor voltage error 74. The cell capacitor voltage error 74 may be quantized into several bins, which, for example, may be called $V_{c--}$, $V_{c-}$, $V_{c0}$, $V_{c+}$, and $V_{c-+}$. These bins may be seen as quantized cell capacitor voltage error 78. The cell capacitor voltage may also be quantized directly to more directly control the voltage within the predefined bounds.

In general, the output voltage error 70 and the cell capacitor voltage error 74 may be quantized and the switching commands 66 for the floating converter cell 30 may be selected from the lookup table 68 indexed by the quantized output voltage error 70 and the quantized capacitor voltage error 74.

Optionally, the phase current 52 of the main converter 12, which due to the series connection of the floating converter cells 30 is common for all circuit elements, is also quantized, for example into bins called $I_{--}$, $I_{-}$, $I_0$, $I_{+}$, and $I_{-+}$. Here, $I_{\parallel}$ denotes a phase current (component) 52 in the positive direction with a large magnitude while $I_{-}$ denotes a phase current (component) 52 in the negative direction with a smaller magnitude. These bins may be seen as a quantized phase current 80. It is possible to determine a change in the cell capacitor voltage 64 by knowing the selected switching command 66 and the direction of the phase current 52. In this way, the change in the capacitor voltage may be related to the selected switching commands 66 and the current magnitude and thus different switching commands 66 for different quantized phase currents 80 may be encoded into the lookup table 68.

The switching commands 66 for the floating converter cells 30 may be selected from the lookup table 68, which is additionally indexed by the quantized main converter phase current 80.

The two or three quantized variables 76, 78, 80 are used to select the switching commands 66 from the two- or three-dimensional lookup table 68.

The switching command 66 for each of the floating converter cells 30 may take three discrete values $s \in \{-1, 0, +1\}$. When $s=+1$, the cell capacitor 38 is connected to the circuit such that the voltage at output 40 is higher than the voltage at the output 24. When $s=-1$, the cell capacitor 38 is connected to the circuit such that the voltage at output 40 is lower than the voltage at the output 24. When $s=0$, the cell capacitor 38 is disconnected from the circuit such that the voltage at output 40 is equal the voltage at the output 24.

Figure 5:
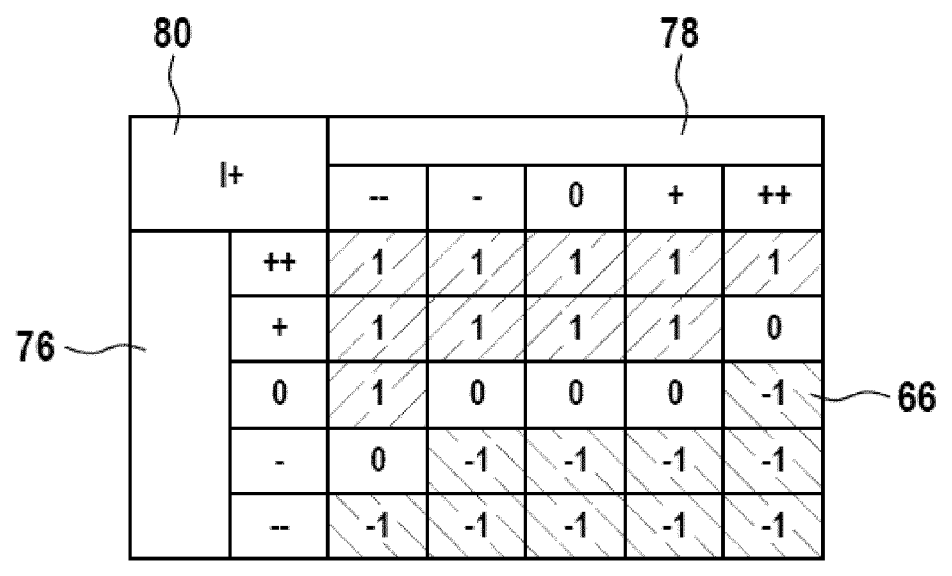

FIG. 5 shows an extract from a possible lookup table 68, showing the switching commands 66 indexed by the above mentioned quantized quantities 76, 78, 80. The entries of the lookup table 68 can be determined offline, depending on the required prioritization between the two objectives of the controller 42, i.e. reduction of the harmonic distortion and capacitor voltage regulation.

In the preceding embodiment, the lookup table operation was described on a single phase basis using an output phase-to-ground (or any other reference) voltage 50 as control input.

It may be possible to extend the lookup table 68 to three or more phases, with different entries in different phase.

Furthermore, in the three-phase or multi-phase case, the common-mode voltage as measured at outputs 40 or 34 may also be considered when compiling the entries of the lookup table 68. A common-mode voltage in the output voltage 54 may be quantized and the lookup table 68 may be additionally indexed by the quantized common-mode voltage.

As mentioned above, an integrated output voltage error may be used as control input and may be quantized. In this way, the controller would control the flux distortion.

Also, as mentioned above, line-to-line voltages and/or line-to-virtual-star-point voltages at the outputs 24, 40, 34 may be used as control input (either directly or integrated as flux).

In the three-phase or multi-phase case, a transformation such as the Clarke, or the Park transformation may be used to simplify the dimensionality of the lookup table 68. More general, a phase voltage 50, 54 and/or a phase current 52 may be transformed into a transformed phase voltage and/or a transformed phase current by a direct-quadrature-zero axis transformation in a stationary or in a rotating reference frame. Then, the lookup table 68 may be indexed by the quantized transformed phase voltage and/or the transformed phase current.

Using a Cost Function

Another embodiment of the second controller stage 46 uses an optimization process that is run online. More specifically, the rules that are used in the determination of the lookup table entries are translated into a cost function. The switching commands 66 of the floating converter cells 30 are selected by minimizing the cost function, which, in general, may be a function of the output voltage error and the cell capacitor voltage 64.

At each evaluation time step, the second controller stage 46 may evaluate all possible switching states or switching commands 66 that are applicable to the floating converter cells 30 and may choose for each floating converter cell 30 the switching command 66 that will result in the lowest value of the cost function. The cost function may be minimized subject to allowed switching transitions and/or the dynamics of the one or more capacitor voltages 64.

Single-phase Modulator with Cost Function

In the following, the case in which each phase is controlled independently from the others by using a single-phase modulator for each phase in the second controller stage 46. In phase a, for example, the second controller stage 46 may consider the switch positions $s_a(k) \in S$, where $S=\{-1,0,1\}$ denotes the set of available single-phase switch positions for one floating converter cell 30. Given the switch position $s_a$ at time step k and the phase current $I_a(k)$, the capacitor voltage at the next time step can be determined according to $$V_{c,a}(k+1) = V_{c,a}(k) + \frac{T_s}{C} I_a(k) s_a(k), \quad (1)$$

where $T_s$ is the sampling interval and C is the capacitance of the cell capacitor 38.

The second controller stage 46 (or the single-phase modulator) may use three cost function terms:

$$J_v = \left(\frac{V_{err,a}(k) + V_{c,a}(k) s_a(k)}{V_{dc}}\right)^2 \quad (2a)$$

$$J_c = \left(\frac{V_c^* - V_{c,a}(k+1)}{V_c^*}\right)^2 \quad (2b)$$

$$J_s = |s_a(k) - s_a(k-1)|. \quad (2c)$$

The first term in (2a) denotes the output voltage error at the phase a output terminal 24 of the main converter 12. It is the difference between the output voltage reference 60 of this phase and the respective phase component of the intermediate voltage 50 at the output 24, i.e. $V_{err,a}(k) = V_a^*(k) - V_{npc,a}(k)$. The second term in (2a) is the cell capacitor voltage 64 that is added by the floating converter cell 30. The sum of these two terms is the future output voltage error at the phase a output terminal at time step k. This future phase voltage error is to be minimized.

In general, the cost function may comprise a term with a sum of the output voltage error and a predicted cell voltage of the floating converter cell 30 after the application of a possible next switching command to the floating converter cell 30.

To simplify the tuning process, the error can be normalized, for example by the DC link voltage 48 of the main converter 12, which is denoted by $V_{dc}$.

The second cost function term (2b) penalizes the predicted capacitor voltage error at time step k+1. This cell capacitor error is the difference between the capacitor voltage reference or setpoint voltage $V_c^*$ and the future capacitor voltage $V_{c,a}(k+1)$. The cell capacitor error may be normalized by the capacitor voltage reference $V_c^*$.

In general, the cost function may comprise a term with a cell capacitor error, which is a difference between a setpoint voltage of the cell capacitor and a predicted cell capacitor voltage of the floating converter cell 30 after the application of a possible next switching command to the floating converter cell 30.

The third cost function term (2c) imposes a penalty on switching transitions to reduce the switching frequency of the semiconductor devices in the floating converter cells 30. Note that |•| is the absolute value of the argument.

A weighted sum of the three terms (2) may be chosen as the cost function $$J = J_v + \lambda_c J_c + \lambda_s J_s. \quad (3)$$

The parameters $\lambda_c$ and $\lambda_s$ are nonnegative scalar weights that may be used to tune the controller behavior and characteristic.

At time step k, the second controller stage 46 in phase a may compute the optimal switch position $s_{opt,a}(k)$ according to the following procedure:

Firstly, for each switch position $s_a(k) \in S$, the cell capacitor voltage at time step k+1, $V_{c,a}(k+1)$ is determined using the model (1) and the associated cost function J is computed according to (3).

Secondly, the switch position $s_{opt,a}(k)$ with the minimum cost function value is determined and a corresponding next switching command for the floating converter cell 30 is chosen.

At the next time step, this procedure is repeated.

In case, direct switching between $s_a=-1$ and $s_a=1$ is not allowed, the constraint $$|s_a(k) - s_a(k-1)| \leq 1 \quad (4)$$

may be imposed on the switching transitions. Also, the cost function comprises a term penalizing a difference between an actual applied switching command and a possible next switching command.

To this end, the set S may be made time-varying and dependent on the previously applied switch position $s_a(k-1)$ according to the following table.

s(k−1) S(k)
1 {0,1}
0 {−1,0,1}
−1 {−1,0}

I.e. the cost function may be minimized subject to a set of admissible switching commands. The admissible switching commands may be determined from a lookup table providing a set of admissible switching commands for each applied switching command.

As a result, either two or three switch positions are considered.

Three-phase Modulator with Cost Function

In the above embodiment, for selecting a next switching command of a floating converter cell 30, the cost function may be minimized separately for every floating converter cell 30, which cost function may be based on the voltage error of a phase of the floating converter cell 30 and the cell capacitor voltage 64 of the respective floating converter cell 30.

However, it is also possible that the next switching commands 66 of all floating converter cells 30 are selected by minimizing a common cost function, which may be a function of the output voltage errors of all phases and the cell capacitor voltages 64 of all converter cells 30.

In particular, the previously described predictive modulator will now be generalized to the three-phase case. In the following, the indices abc are used to denote three-phase quantities, and the indices αβ are used to denote quantities in the stationary orthogonal coordinate system. To transform quantities from the abc system into the αβ coordinate system, the Clarke transformation K is used. The latter is a 2×3 dimensional matrix.

In general, the common cost function may be based on a transformed quantity being transformed by a direct-quadrature-zero axis transformation in a stationary or in a rotating reference frame.

The second controller stage 46 may consider the three-phase switch positions $s_{abc}(k)=[s_a(k)\ s_b(k)\ s_c(k)]^T \in S$, where $S=\{-1,0,1\}^3$ denotes the set of available three-phases switch positions. S may have 27 elements. Given the switch position $s_{abc}$ at time step k and the three-phase current $I_{abc}(k)=[I_a(k) I_b(k) I_c(k)]^T$, the three cell capacitor voltages at the next time step can be determined according to $$V_{c,abc}(k+1) = V_{c,abc}(k) + \frac{T_s}{C}\begin{bmatrix} I_a(k)s_a(k) \\ I_b(k)s_b(k) \\ I_c(k)s_c(k) \end{bmatrix}, \quad (5)$$

where $V_{c,abc}=[V_{c,a}\ V_{c,b}\ V_{c,c}]^T$. As previously, $T_s$ denotes the sampling interval and C is the capacitance of the cell capacitor 38. In (5) it is assumed that the capacitances are the same in all floating converter cells 30 and time-invariant. However, also different and/or time-varying capacitances C may be considered.

At the outputs 24 of the main converter 12, the floating converter cells 30 add the αβ voltages $$V_{f,\alpha\beta}(k) = K \begin{bmatrix} V_{c,a}(k)s_a(k) \\ V_{c,b}(k)s_b(k) \\ V_{c,c}(k)s_c(k) \end{bmatrix} \quad (6)$$

at time step k, depending on the capacitor voltages and the switch positions.

The second controller stage may use three cost function terms, which are generalized to the three-phase case as $$J_v = \left\| \frac{V_{err,\alpha\beta}(k) + V_{f,\alpha\beta}(k)}{V_{dc}} \right\|_2^2 \quad (7a)$$

$$J_c = \left\| \frac{[1\ 1\ 1]^T V_c^* - V_{c,abc}(k+1)}{V_c^*} \right\|_2^2 \quad (7b)$$

$$J_s = \|s_{abc}(k) - s_{abc}(k-1)\|_1. \quad (7c)$$

The first term in (7a) is the difference between the output voltage reference 60 transformed to the αβ frame and the intermediate voltage 50 at the output 24 of the main converter 12, i.e. $V_{err,\alpha\beta}(k)=V_{\alpha\beta}^*(k)-V_{npc,\alpha\beta}(k)$. The second term is the αβ cell capacitor voltage that is added by the floating converter cells 30. The sum of these two terms is the future differential-mode output voltage error at time step k. This output voltage error is to be minimized.

To simplify the tuning process, the error can be normalized by the DC link voltage 48 of the power converter 12, which is denoted by $V_{dc}$. Note that $\|\cdot\|_2^2$ is the squared 2-norm of the vectorial argument, i.e. the sum of the squares of the arguments' components.

The second cost function term (7b) penalizes the cell capacitor errors of the three capacitor voltages 64 at time step k+1. These cell capacitor errors are the differences between a capacitor voltage reference $V_c^*$ (which may be assumed to be the same for all capacitors 38) and the vector of the capacitor voltages of the phases $V_{c,abc}(k+1)$ at the next time step.

The cell capacitor errors may be normalized by the capacitor voltage reference $V_c^*$. Note that the vector $[1\ 1\ 1]^T$ is of the dimension 3×1.

The third cost function term (7c) imposes a penalty on switching transitions in the three-phases. Note that $\|\cdot\|_1$ is the 1-norm of the vectorial argument, i.e. the sum of the absolute values of the arguments components.

The weighted sum of the three terms (7) is defined as the cost function $$J=J_v+\lambda_c J_c+\lambda_s J_s. \quad (8)$$

The parameters $\lambda_c$ and $\lambda_s$ are nonnegative scalar weights that are used to tune the controller behavior and characteristic.

At time step k, the second controller stage 46 may compute the optimal three-phase switch position $s_{opt,abc}(k)$ according to the following procedure:

Firstly, for each switch position $s_{abc}(k) \in S$, the capacitor voltages at time step k+1, $V_{c,abc}(k+1)$ are predicted using the model (5), the differential-mode voltage at the output 40 of the floating converter cells 30 are computed using (6) and the associated cost function value J is computed according to (8).

Secondly, the switch position $s_{opt,abc}(k)$ with the minimum cost is determined and corresponding next switching commands 66 for the floating converter cells 30 are chosen.

At the next time step, this procedure is repeated.

In case, direct switching in a phase between −1 and 1 is not allowed, the constraint $$\|s_{abc}(k)-s_{abc}(k-1)\|_\infty \leq 1 \quad (9)$$

may be imposed on the three-phase switching transitions. Note that $\|\cdot\|_\infty$ denotes the infinity-norm of the vectorial argument, i.e. the maximum absolute value of the arguments' components. The set of allowed switching transitions S can be modified based on the single-phase case.

It has to be noted that the exact formulation of the cost function terms $J_v$, $J_c$, and $J_s$ may be adapted offline in order to achieve different system tradeoffs.

For example, the definition of $J_c$ may be $$J_c = \left( \frac{c_1(V_c^* - V_c(k+1))^{c_2} + c_3(V_c^* - V_c(k+1))}{c_4} \right)^2 \quad (10)$$

where $c_1$, $c_2$, $c_3$, and $c_4$ are adaptable parameters. The parameter $c_2$, which exponentiates the cell capacitor error, may be used for tuning the penalty for the cell capacitor error, which may be very low inside specific bounds and very high outside these bounds.

Furthermore, in the determination in the different terms $J_v$, $J_c$, and $J_s$ the squared 2-norm may be replaced with the 1-norm or infinity-norm.

Other cost function elements such as for example a term that describes the cost associated with the common-mode voltage at the outputs 40 or 34 also may be added.

As a further example, the cost function term Js may determine the cost of switching based on the actual switching losses, as determined by the current 52 and the cell capacitor voltages 64.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 converter system
12 main converter
14 floating cell stage
15 power grid
16 electrical load
18 rectifier
20 main DC link
22 output converter
24 output of the main converter
26 clamp circuit
28 inductor/resistor
30 floating converter cell
32 output filter
34 output of converter system
36 semiconductor switch arrangement/half-bridges
38 cell capacitor
40 output of floating converter cell
42 controller
44 first controller stage
46 second controller stage
48 DC link voltage
50 intermediate voltage
52 phase current
54 output voltage
56 setpoints
58 further sensor data
60 output voltage reference
62 main converter switching commands
64 cell capacitor voltage
66 floating converter cell switching commands
68 lookup table
70 output voltage error
72 cell capacitor voltage reference
74 cell capacitor error
76 quantized output voltage error
78 quantized cell capacitor error
80 quantized phase current

The invention claimed is:

1. A method for controlling a converter system, the method comprising:
  determining, with a first controller stage, an output voltage reference for the converter system;
  generating, with the first controller stage, switching commands for a main converter based on the output voltage reference, such that the main converter converts an input voltage into an intermediate voltage provided at an output of the main converter and following the output voltage reference;
  generating, with a second controller stage, switching commands for a floating converter cell connected to the output of the main converter, such that the floating converter cell converts the intermediate voltage into an output voltage provided at an output of the floating converter cell, wherein the floating converter cell comprises a cell capacitor and a semiconductor switch arrangement for connecting and disconnecting the cell capacitor between the output of the main converter and the output of the floating converter cell;
  wherein the switching commands for the floating converter cell are selected by:
  determining an output voltage error indicative of a deviation of the output voltage from the output voltage reference;
  determining a cell capacitor voltage of the floating converter cell;
  quantizing the output voltage error and cell capacitor voltage;
  selecting switching commands for the floating converter cell from a lookup table indexed by the quantized output voltage error and the quantized capacitor voltage, such that the output voltage error is reduced and such that the cell capacitor voltage stays within predefined bounds.

2. The method of claim 1, further comprising:
  quantizing a main converter phase current measured in the output of the main converter and selecting the switching commands for the floating converter cell from the lookup table additionally indexed by the quantized main converter phase current;
  wherein the lookup table is additionally indexed by a phase of the output voltage.

3. The method of claim 1,
  wherein a common-mode voltage in the output voltage is quantized and the lookup table is additionally indexed by the quantized common-mode voltage.

4. The method of claim 1, wherein at least one of a phase voltage and a phase current are transformed into at least one of a quantize transformed phase voltage and a transformed phase current by a direct-quadrature-zero axis transformation in one of a stationary and a rotating reference frame; and
  wherein the lookup table is indexed by at least one of the quantized transformed phase voltage and the quantized transformed phase current.

5. The method of claim 1,
  wherein the output voltage error is based on a difference of an actual intermediate voltage measured at the output of the main converter and the output voltage reference; or
  wherein the output voltage error is based on a time integral over the difference between the output voltage reference and the actual intermediate voltage; or
  wherein the output voltage error is based on a difference of an actual phase-to-phase voltage between outputs of the main converter and a phase-to-phase output voltage reference; or
  wherein the output voltage error is based on a time integral over the difference of an actual phase-to-phase voltage between outputs of the main converter and a phase-to-phase output voltage reference.

6. The method of claim 1,
  wherein the main converter comprises more than one output providing an intermediate voltage with more than one phase;
  wherein at least one floating converter cell is connected to each output of the main converter, such that each floating converter cell converts a phase of the intermediate voltage into a phase of the output voltage provided at an output of the respective floating converter cell.

7. The method of claim 2, wherein a common-mode voltage in the output voltage is quantized and the lookup table is additionally indexed by the quantized common-mode voltage.

8. The method of claim 2, wherein at least one of a phase voltage and a phase current are transformed into at least one of a quantize transformed phase voltage and a quantize transformed phase current by a direct-quadrature-zero axis transformation in a stationary or in a rotating reference frame; or wherein the lookup table is indexed by at least one of the quantized transformed phase voltage and the quantized transformed phase current.

9. The method of claim 3, wherein at least one of a phase voltage and a phase current are transformed into at least one of a quantize transformed phase voltage and a quantize transformed phase current by a direct-quadrature-zero axis transformation in a stationary or in a rotating reference frame; or wherein the lookup table is indexed by at least one of the quantized transformed phase voltage and the quantized transformed phase current.

10. A method for controlling a converter system, the method comprising: determining, with a first controller stage, an output voltage reference for the converter system; generating, with the first controller stage, switching commands for a main converter based on the output voltage reference, such that the main converter converts an input voltage into an intermediate voltage provided at an output of the main converter and following the output voltage reference; generating, with a second controller stage, switching commands for a floating converter cell connected to the output of the main converter, such that the floating converter cell converts the intermediate voltage into an output voltage provided at an output of the floating converter cell, wherein the floating converter cell comprises a cell capacitor and a semiconductor switch arrangement for connecting and disconnecting the cell capacitor between the output of the main converter and the output of the floating converter cell; wherein the switching commands for the floating converter cell are selected by: determining an output voltage error indicative of a deviation of the output voltage from the output voltage reference; determining a cell capacitor voltage of the floating converter cell; selecting switching commands for the floating converter cell by minimizing a cost function, which is a function of the output voltage error and the cell capacitor voltage, such that the output voltage error is reduced and such that the cell capacitor voltage stays within predefined bounds.

11. The method of claim 10, wherein the cost function comprises at least one of: a term with a sum of the output voltage error and a predicted cell voltage of the floating converter cell after an application of a possible next switching command to the floating converter cell; and a term penalizing a difference between an actual applied switching command and a possible next switching command.

12. The method of claim 10,
wherein the cost function is minimized subject to a set of admissible switching commands.

13. The method of claim 12,
wherein the admissible switching commands are determined from a lookup table providing a set of admissible switching commands for each applied switching command.

14. The method of claim 10, wherein at least one of:
for selecting a next switching command of a floating converter cell, a cost function is minimized separately for every floating converter cell, which cost function is based on the voltage error of a phase of the floating converter cell and the cell capacitor voltage of the floating converter cell;
the next switching commands of all floating converter cells are selected by minimizing a common cost function being a function of the output voltage error of all phases and the cell capacitor voltages of all converter cells; and
the common cost function is based on a transformed quantity being transformed by a direct-quadrature-zero axis transformation in a stationary or in a rotating reference frame.

15. The method of claim 11, wherein the cost function is minimized subject to a set of admissible switching commands.

16. The method of claim 15, wherein the admissible switching commands are determined from a lookup table providing a set of admissible switching commands for each applied switching command.

17. A controller with a first controller stage and a second controller stage adapted for controlling a converter system, comprising: determine, with the first controller stage, an output voltage reference for the converter system; generate, with the first controller stage, switching commands for a main converter based on the output voltage reference, such that the main converter converts an input voltage into an intermediate voltage provided at an output of the main converter and following the output voltage reference; generate, with the second controller stage, switching commands for a floating converter cell connected to the output of the main converter, such that the floating converter cell converts the intermediate voltage into an output voltage provided at an output of the floating converter cell, wherein the floating converter cell comprises a cell capacitor and a semiconductor switch arrangement for connecting and disconnecting the cell capacitor between the output of the main converter and the output of the floating converter cell; wherein the switching commands for the floating converter cell are selected by: determine an output voltage error indicative of a deviation of the output voltage from the output voltage reference; determine a cell capacitor voltage of the floating converter cell; quantizing the output voltage error and cell capacitor voltage; select switching commands for the floating converter cell from a lookup table indexed by the quantized output voltage error and the quantized capacitor voltage, such that the output voltage error is reduced and such that the cell capacitor voltage stays within predefined bounds.

18. A converter system for converting an input voltage into an output voltage, comprising: a main converter for converting the input voltage into the intermediate voltage provided by at least one main converter output; a floating cell stage for converting the intermediate voltage into the output voltage provided by at least one floating cell stage output; wherein the floating cell stage comprises at least one floating converter cell interconnecting a main converter output with the respective floating cell stage output; and a controller according to claim 17.

19. The converter system of claim 18,
wherein the floating cell stage comprises at least one electrical filter, wherein the electrical filter is connected between a floating cell and a converter output;
wherein the output voltage is measured at least one of between the floating converter cell and the electrical filter and between the floating converter cell and the converter output.

* * * * *